United States Patent
Tathe et al.

(10) Patent No.: US 12,319,838 B2
(45) Date of Patent: Jun. 3, 2025

(54) WATER ABSORBING, ELECTRICALLY CONDUCTIVE COMPOSITION AND USE OF IT AS A SENSOR FOR EROSION AND/OR CORROSION MONITORING

(71) Applicant: Henkel AG & Co. KGaA, Düsseldorf (DE)

(72) Inventors: Dipak Tathe, Buldhana-Maharashtra (IN); Jayesh P Shah, Pune (IN)

(73) Assignee: HENKEL AG & CO. KGaA, Duesseldorf (DE)

( * ) Notice: Subject to any disclaimer, the term of this patent is extended or adjusted under 35 U.S.C. 154(b) by 0 days.

(21) Appl. No.: 18/545,261

(22) Filed: Dec. 19, 2023

(65) Prior Publication Data
US 2024/0117203 A1     Apr. 11, 2024

Related U.S. Application Data

(63) Continuation of application No. PCT/EP2022/066279, filed on Jun. 15, 2022.

(30) Foreign Application Priority Data

Jul. 5, 2021   (IN) .............................. 202141030113

(51) Int. Cl.
*C09D 5/24* (2006.01)
*C09D 7/20* (2018.01)
(Continued)

(52) U.S. Cl.
CPC ................. *C09D 5/24* (2013.01); *C09D 7/20* (2018.01); *C09D 7/61* (2018.01); *C09D 101/28* (2013.01);
(Continued)

(58) Field of Classification Search
CPC ... C09D 5/24; C09D 7/20; C09D 7/61; C09D 101/28; C09D 133/02; C09D 139/06;
(Continued)

(56) References Cited

U.S. PATENT DOCUMENTS

| 5,051,208 A * | 9/1991 | Bowns ...................... C08K 3/08 |
| | | 524/439 |
| 5,855,820 A * | 1/1999 | Chan ........................ H01B 1/22 |
| | | 252/514 |

(Continued)

FOREIGN PATENT DOCUMENTS

| CN | 110467864 A | 11/2019 |
| EP | 0917155 A1 | 5/1999 |

(Continued)

OTHER PUBLICATIONS

PCT International Search Report—WO PCT/EP2022/066279—Completed: Sep. 21, 2022, Mailing date: Oct. 11, 2022—Number of pp. 3.

Primary Examiner — Mark Kopec
Assistant Examiner — Jaison P Thomas
(74) Attorney, Agent, or Firm — Sun Hee Lehmann

(57) ABSTRACT

The present invention relates to a water absorbing, electrically conductive composition comprising a) a water soluble and/or water swellable and/or water absorbing resin; b) an electrically conductive filler; and c) a solvent. The water absorbing, electrically conductive composition according to according to the present invention can be used as a sensor for erosion and/or corrosion monitoring.

10 Claims, 1 Drawing Sheet

(51) Int. Cl.
    *C09D 7/61*         (2018.01)
    *C09D 101/28*     (2006.01)
    *C09D 133/02*     (2006.01)
    *C09D 139/06*     (2006.01)
    *G01N 17/02*      (2006.01)
    *H01B 1/00*       (2006.01)
    *C08K 3/04*       (2006.01)

(52) U.S. Cl.
    CPC ......... *C09D 133/02* (2013.01); *C09D 139/06* (2013.01); *G01N 17/02* (2013.01); *H01B 1/00* (2013.01); *C08K 3/04* (2013.01); *C08K 2201/001* (2013.01)

(58) Field of Classification Search
    CPC . C09D 7/65; C09D 5/08; G01N 17/02; C08K 3/04; C08K 2201/001; C08F 120/06
    See application file for complete search history.

(56) References Cited

U.S. PATENT DOCUMENTS

| | | |
|---|---|---|
| 2016/0334325 A1 | 11/2016 | Jaworowski et al. |
| 2020/0060541 A1 | 2/2020 | Andrade et al. |

FOREIGN PATENT DOCUMENTS

| | | |
|---|---|---|
| ES | 2000347 A6 | 2/1988 |
| WO | 9415344 A1 | 7/1994 |
| WO | 2014085252 A1 | 6/2014 |

\* cited by examiner

WATER ABSORBING, ELECTRICALLY CONDUCTIVE COMPOSITION AND USE OF IT AS A SENSOR FOR EROSION AND/OR CORROSION MONITORING

TECHNICAL FIELD

The present invention relates to a water absorbing, electrically conductive composition comprising a water soluble and/or water swellable and/or water absorbing resin and use of the composition as a sensor for erosion and/or corrosion monitoring.

TECHNICAL BACKGROUND

Protective Coatings are used to protect the plant assets like pumps, heat exchangers, storage tanks, pipes, chutes etc. from against harsh environment of chemicals, abrasion, and environmental corrosion etc. The protective coating increases the asset life by several years, however, with continuous operation under harsh working conditions (temperature, humidity, chemical etching, and abrasion), it too loses the performance as it starts to crack, erode, and delaminate from the parent substrate over time. Once coating starts to fail, the parent substrate is directly exposed to the harsh working environment and becomes vulnerable. The substrates start to corrode and/or erode and lose their wall thickness which, may lead to reduced operational efficiency of the asset or leads to equipment break down causing unplanned down time. Unplanned downtime leads to productivity loss. Delay in equipment repair increases risk of sudden failure which, also jeopardizes safety of the workers.

Sometimes, the erosion of the coating is visible and easy to detect, however, this is not always the case. Further, the detection depends on the location where the coating material is used, sometimes location is not detectable by eyes. Operation conditions like flow, temperature, pressure etc. for productivity and efficiency are monitored in many processing industry equipment. However, it is impossible to monitor continuously the coating inside the tank, pipes, propellers etc. and the coating's erosion and/or corrosion behaviour and timing is unknown. The current method is either based on a plant manager's experience and historical data, however it is not based on a predictive maintenance. According to the current practice, the asset conditions are observed during the annual plant shutdown in many industries, at which time some assets are already damaged and need replacement which incurs high cost. This could be avoided if predictive maintenance practices are in place.

Therefore, there is a need to develop sensory materials to sense and monitor coatings performance so that the failure can be prevented by early detection and appropriate timely measure for increasing asset life while maintaining high productivity.

SUMMARY OF THE INVENTION

The present invention relates to a water absorbing, electrically conductive composition comprising a) a water soluble and/or water swellable and/or water absorbing resin; b) an electrically conductive filler; and c) a solvent.

The present invention also relates to a cured product of a water absorbing, electrically conductive composition according to the present invention.

The present invention encompasses use of a water absorbing, electrically conductive composition, or a cured product according to the present invention as a sensor for erosion and/or corrosion monitoring.

SHORT SUMMARY OF THE FIGURES

DETAILED DESCRIPTION OF THE INVENTION

Figure 1:
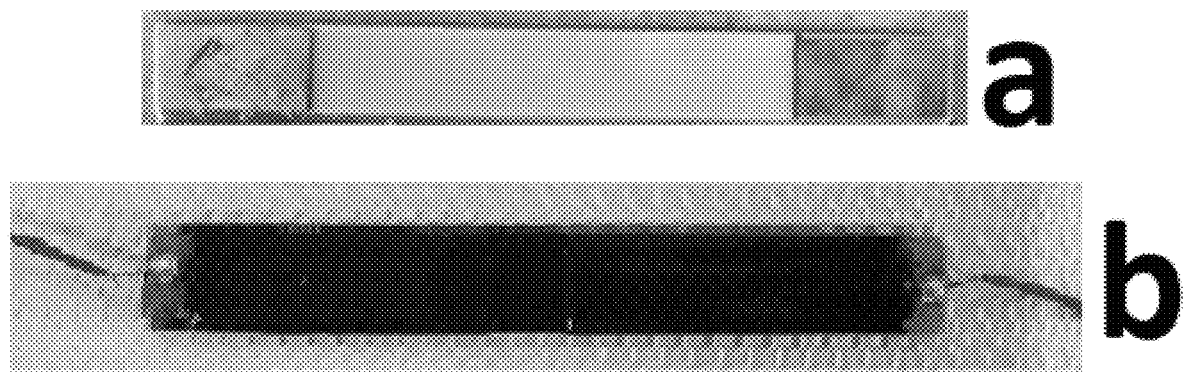
FIG. 1 illustrates a substrate and a coated substrate (FIGS. 1a and 1b).

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

As used herein, the term "consisting of" excludes any element, ingredient, member or method step not specified.

The recitation of numerical end points includes all numbers and fractions subsumed within the respective ranges, as well as the recited end points.

All percentages, parts, proportions and then like mentioned herein are based on weight unless otherwise indicated.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in disclosing the invention, including technical and scientific terms, have the meaning as commonly understood by one of the ordinary skilled in the art to which this invention belongs to. By means of further guidance, term definitions are included to better appreciate the teaching of the present invention.

The present invention relates to a water absorbing, electrically conductive composition comprising a water soluble and/or water swellable and/or water absorbing resin. The water absorbing, electrically conductive composition according to the present invention can be used as a sensor for erosion and/or corrosion monitoring.

The applicant has found out that water absorbing electrically conductive coating composition can be used as sensor to monitor the erosion of the coating (a protective top layer applied on a surface of a substrate).

The present invention relates to a water absorbing, electrically conductive composition comprising a) a water soluble and/or water swellable and/or water absorbing resin; b) an electrically conductive filler; and c) a solvent.

A water absorbing, electrically conductive composition according to the present invention comprises a water soluble and/or water swellable and/or water absorbing resin. A water soluble and/or water swellable and/or water absorbing resin can be any resin which is water soluble, or swells in the presence of water or absorbs water. Preferably, the water soluble and/or water swellable and/or water absorbing resin is selected from the group consisting of sodium polyacrylate, polyvinylpyrrolidone (PVP), cellulose ethers, methyl cellulose, hydroxyl propyl cellulose, arabic gum, starch (dextrin), casein (phosphoproteins) and mixtures thereof, more preferably selected from the group consisting of sodium polyacrylate, polyvinylpyrrolidone (PVP), methyl cellulose and mixtures thereof.

Sodium polyacrylate, polyvinylpyrrolidone (PVP) and methyl cellulose are preferred because of their excellent water solubility properties.

Suitable commercially available water soluble and/or water swellable and/or water absorbing resin for use in the present invention include but are not limited to sodium polyacrylate from Prime Specialities, India; polyvinylpyrrolidone (PVP) from Ashland Specialty Ingredients; and methyl cellulose from DOW Chemical Company.

A water soluble and/or water swellable and/or water absorbing resin may be present in a water absorbing, electrically conductive composition according to the present invention in a quantity of from 5 to 30% by weight of the total weight of the composition, preferably from 7.5 to 25%, more preferably from 8 to 22%.

The applicant has found out that these quantities are preferred because higher quantities than 30% may lead to stability problems during application. Quantities lower than 5% may not provide desired water detection effect. Further, the range from 5 to 30% of a water soluble and/or water swellable and/or water absorbing resin was found to be optimum that offers better response as a sensor.

A water absorbing, electrically conductive composition according to the present invention comprises an electrically conductive filler. In theory any electrically conductive filler may be used. Preferably, said electrically conductive filler is selected from the group consisting of carbon, carbon black, carbon nanotubes, graphite, graphene, silver, nickel, copper, gold, platinum, aluminium, iron, zinc, cobalt, lead, tin alloys, silver coated copper, silver coated graphite, silver coated polymers, silver coated aluminium, silver coated glass, silver coated carbon, silver coated boron nitride, silver coated aluminium oxide, silver coated aluminium hydroxide and mixtures thereof, more preferably selected from the group consisting of carbon black, carbon nanotubes, graphite and mixtures thereof.

In one embodiment the electrically conductive filler is carbon black.

In one embodiment the electrically conductive filler is carbon nanotubes.

In one embodiment the electrically conductive filler is graphite.

Yet in another embodiment the electrically conductive filler is a mixture of carbon black and graphite.

Yet in another embodiment the electrically conductive filler is a mixture of carbon black, graphite and carbon nanotubes.

Suitable commercially available electrically conductive fillers for use in the present invention include but are not limited to Timrex SGF 15 from Imerys Graphite & Carbon and Vulcan PF from Cabot Corporation, Vulcan XC 72 from Cabot Corporation An electrically conductive filler may be present in a water absorbing, electrically conductive composition according to the present invention in a quantity of from 10 to 35% by weight of the total weight of the composition, preferably from 12 to 33%, more preferably from 15 to 30%.

The applicant has found out that these quantities are preferred because higher quantities than 35% may lead to rheology problems during application, whereas quantities lower than 10% may not provide desired conductivity.

When the electrically conductive filler is any of carbon black, carbon nanotubes or graphite the quantity may also depend on the oil absorption number of the filler. The oil absorption number is different for carbon black, carbon nanotubes and graphite and it depends on the particle size and a specific surface area of the conductive filler. For example, carbon nanotubes have a small particle size (nano scale), and therefore, high oil absorption value. As a general guidance, higher the oil absorption number, lower the particle quantity needed. The oil absorption number is measured according to ASTM-D281.

A water absorbing, electrically conductive composition according to the present invention comprises a solvent. Suitable solvent for use in the present invention has a boiling point less than 235° C. Preferably said solvent is selected from the group consisting of n-butanol, butylcarbitol, 1-methoxy-2-propanol acetate, isopropyl alcohol, butyl cellosolve and mixtures thereof, more preferably selected from the group consisting of n-butanol, butylcarbitol, 1-methoxy-2-propanol acetate and mixtures thereof.

Preferred solvents n-butanol, butylcarbitol, 1-methoxy-2-propanol acetate are desired because they are polar solvents and act on composition processability. Further, these preferred solvents also act as coalescing agents in the composition.

Suitable commercially available solvent for use in the present invention include but is not limited to n-butanol from Sigma Aldrich.

A solvent may be present in a water absorbing, electrically conductive composition according to the present invention in a quantity of from 10 to 70% by weight of the total weight of the composition, preferably from 20 to 65%, more preferably from 30 to 60%.

This solvent quantity range is preferred because it provides good applicability (composition) on a substrate.

A water absorbing, electrically conductive composition according to the present invention may further comprise a resin. Suitable resin for use in the present invention is preferably a thermoplastic resin. Thermoplastic resin-based composition allows the water absorbing polymer to absorb the water and change the electrical resistance of the composition.

In a highly preferred embodiment the water absorbing, electrically conductive composition according to the present invention comprises a resin.

Preferably said resin is selected from the group consisting of vinyl resin, copolymer of vinyl chloride and vinyl acetate, thermoplastic polyurethane resin, polyvinyl butyral resin, (meth)acrylate resin, phenoxy resin, epoxy resin, polyester resin and mixtures thereof, more preferably said resin is selected from the group consisting of copolymer of vinyl chloride and vinyl acetate, polyvinyl alcohol resin, polyvinyl butyral resin and mixtures thereof.

Copolymer of vinyl chloride and vinyl acetate, polyvinyl alcohol resin and polyvinyl butyral resin are preferred resins because they are nonoxidizing and are permanently flexible while providing desired toughness and durability. Further, they are characterized by the absence of colour, odour, and taste. Dilute alkalis, mineral acids, alcohols, greases, oils and aliphatic hydrocarbons cannot adversely affect the polymers at room temperature or at environmental temperature.

Suitable commercially available resin for use in the present invention include but is not limited to UCAR Vagh from Dow Chemical Company.

A resin may be present in a water absorbing, electrically conductive composition according to the present invention in a quantity of from 5 to 25% by weight of the total weight of the composition, preferably from 7.5 to 20%, more preferably from 9 to 15%.

The applicant has found out that these quantities are preferred because higher quantities than 25% may lead to poor conductivity. In addition, too high quantities may lead to rheology problems during application. Whereas quantities lower than 5% may not provide desired adhesion to the substrate and/or base layer(coat) and/or top layer(coat).

A water absorbing, electrically conductive composition according to the present invention may further comprise a defoamer. During preparation of the composition according to the present invention, a defoamer may be added into the composition to reduce foaming in a dispersion process.

Any commercially available defoamer can be used in the composition according to the present invention. Suitable defoamer for use in the present invention is for example silicone-free polymer air release agent.

Suitable commercially available defoamer for use in the present invention include but is not limited to BYK-A 505 from BYK.

A defoamer may be present in a water absorbing, electrically conductive composition according to the present invention in a quantity of from 0.1 to 1% by weight of the total weight of the composition, preferably from 0.1 to 0.7%, more preferably from 0.1 to 0.5%.

The applicant has found out that these quantities are preferred because higher quantities than 1% may adversely affect the coating performance, such as surface wettability. Whereas quantities lower than 0.1% may not provide desired defoaming effect.

The present invention also relates to a cured product of a water absorbing, electrically conductive composition according to the present invention.

The present invention relates to use of the water absorbing, electrically conductive composition according to the present invention or the cured product according to the present invention as a coating material.

The present invention encompasses use of the water absorbing, electrically conductive composition according to the present invention or the cured product according to the present invention as a sensor for erosion and/or corrosion monitoring.

The sensor for erosion and/or corrosion monitoring according to the present invention can be used for example of an application where predictive monitoring would help to extend the asset life. A sensor for erosion and/or corrosion monitoring according to the present invention will be beneficial for example in steel plants and power and mining industry slurry pumps. These slurry pumps are widely used to transport wet ore slurry to various parts for processing. They are critical assets which are exposed to severe erosion and corrosion environment and requires frequent replacement etc.

EXAMPLES

All weights are wt. % unless otherwise stated.

Samples were prepared for the electrical resistance measurement as follows:

The composite test vehicle (125×12.7×3 mm) FIG. 1) which has 50 μm thick copper leads for wire connection. These copper leads were used for shouldering the wire for measuring the resistance of coated specimen. The composition according to the present invention was applied over this specimen and subsequently the specimens were cured at room temperature for 24 hours and post cured at 100° C. for 30 min. The electrical resistance was measured according to ASTM D2739-97.

Figure 2:
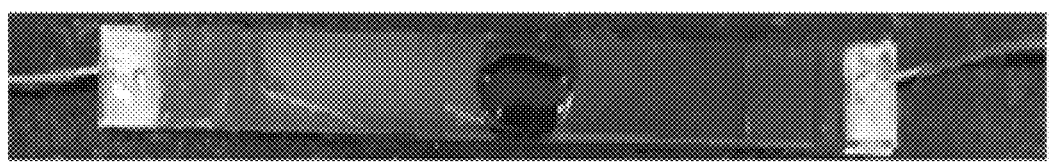
FIG. 2 illustrates a testing substrate.

Water drop test was performed as follows: Panels were coated with an electrically conductive composition according to the present invention for the test. The composition was applied on the surface of the substrate and dried in an oven at 100° C. for 30 min. FIG. 1 illustrates the substrate and coated substrate (FIGS. 1a and 1b). The water drop test was performed by adding 2 to 3 drops of water at the centre of the coated substrate. The electrical resistance was measured before and after addition of the water drops. The electrical resistance of the substrates was measured by using Keysight DAQ970A—Data Acquisition System. The testing substrate is illustrated in the FIG. 2.

Following chemicals are used in the examples:
Timrex SGF 15 from Imerys Graphite & Carbon
Vulcan PF and Vulcan XC 72 from Cabot Corporation
Arcosolv PM Acetate from Lyondell Chemical Company
Butylcarbitol from Dow Chemical Company
UCAR Wagh from Dow Chemical Company
Polyvinylpyrrolidone (PVP) from Ashland Specialty Ingredients
Methyl cellulose from DOW Chemical Company
n-Butanol from Sigma Aldrich
Sodium Polyacrylate from Prime Specialities, India Example 1

Table 1 below exemplify the presence of sodium polyacrylate as a water absorbing polymer (example 1) and composition without it (comparative example 1a). The compositions were prepared in high-speed mixer at 2000 rpm for 30 min.

TABLE 1

| Material | Comparative example 1a | Example 1 |
| --- | --- | --- |
| Timrex SGF 15 | 15 | 13.16 |
| Vulcan PF | 7.5 | 6.56 |
| Arcosolv PM Acetate | 21.3 | 18.62 |
| Butylcarbitol | 42.7 | 37.35 |
| UCAR Wagh | 13.5 | 11.81 |
| Sodium Polyacrylate | — | 12.5 |
| % Solid | 36 | 44.03 |
| % Filler | 22.5 | 19.72 |
| P/B ratio | 1.67 | 0.81 |

Substrates were coated with the compositions of examples 1 and 1a and were used to perform the water drop test. Coated substrate is illustrated in FIG. 1. The test vehicle (shown in FIG. 2) was used for measuring the electrical resistance with and without exposure to water. The results of water drop test is shown in the table 2 below. Example 1 showed good response to the water, electrical resistance increased 62.92% in 30 min. Comparative example 1a on the other hand did not show change in electrical resistance after 5 min.

TABLE 2

| Time | Comparative example 1a | Example 1 |
|---|---|---|
| Resistance, 0 min, Ω | 33.78 | 27.16 |
| Resistance, 5 min, Ω | 33.79 | 31.15 |
| % Change—5 min, | 0.03 | 14.7 |
| Resistance, 10 min, Ω | — | 33.19 |
| % Change—10 min | — | 22.2 |
| Resistance, 30 min, Ω | — | 44.25 |
| % Change—30 min | — | 62.92 |

Example 2

The compositions comprising PVP or Methocel VLV based water absorbing polymer in a thermoplastic binder are shown in table 3 below. Compositions comprising 10 and 20% of PVP and Methuen VLV were prepared in high-speed mixer at 2000 rpm for 30 min.

TABLE 3

| Material | Example 2 | Example 3 | Example 4 | Example 5 | Example 6 |
|---|---|---|---|---|---|
| Timrex SGF 15 | 13.39 | 13.5 | 12 | 13.5 | 12 |
| Vulcan PF | — | 6.75 | 6 | 6.75 | 6 |
| Vulcan XC 72 | 13.39 | — | — | — | — |
| n-Butanol | 57.15 | — | — | — | — |
| Arcosolv PM Acetate | — | 19.17 | 17.04 | 19.17 | 17.04 |
| Butylcarbitol | — | 38.43 | 34.16 | 38.43 | 34.16 |
| UCAR Vagh | — | 12.15 | 10.8 | 12.15 | 10.8 |
| PVP | 16.07 | 10 | 20 | — | — |
| Methocel VLV | — | — | — | 10 | 20 |
| % Solid | 42.85 | 42.4 | 48.8 | 42.4 | 48.8 |
| % Filler | 26.78 | 20.25 | 18 | 20.25 | 18 |
| P/B ratio | 1.67 | 0.91 | 0.58 | 0.91 | 0.58 |

A layer of a conductive coating composition was applied on a substrate and kept in oven at 100° C. for 30 min. Coated substrate is illustrated in FIG. 1. The test vehicle (shown in FIG. 2) was used for measuring the electrical resistance with and without exposure to water. The compositions comprising 10 and 20% of PVP (examples 3 and 4) exemplified 381% and 528 change in electrical resistance respectively in 10 min. Further, compositions comprising 10 and 20% Methocel VLV (examples 5 and 6) exemplified 25.86 and 133% change in electrical resistance respectively in 10 min. PVP based coating composition where PVP used as a sole binder (example 2) exemplified 27054% change in electrical resistance in 10 min. The results are shown in the table 4.

TABLE 4

| Time | Example 2 | Example 3 | Example 4 | Example 5 | Example 6 |
|---|---|---|---|---|---|
| Initial | 68.86 Ω | 1.57 KΩ | 51.6 KΩ | 42 Ω | 92.99 Ω |
| Resistance, 1 min | 9700 Ω | 1.87 KΩ | 114.8 KΩ | 43.4 Ω | 106.7 Ω |
| % change | 13985 | 18.6 | 122 | 2.35 | 14.7 |
| Resistance, 2 min | 18400 Ω | 5.43 KΩ | 138.5 KΩ | 44.36 Ω | 121.9 Ω |
| % change | 26618 | 244.6 | 168 | 4.63 | 31.1 |
| Resistance, 5 min | 18050 Ω | 9.23 KΩ | 186 KΩ | 46.86 Ω | 165.7 Ω |
| % change | 26110 | 485.8 | 260 | 10.53 | 78.2 |
| Resistance, 10 min | 18700 Ω | 9.9 KΩ | 248.7 KΩ | 53.35 Ω | 216.7 Ω |
| % change | 27054 | 528 | 381 | 25.86 | 133 |

The invention claimed is:

1. A water absorbing, electrically conductive composition comprising:
    a) from 8 to 30 wt % of a water soluble and/or water swellable and/or water absorbing resin;
    b) from 10 to 35 wt % of an electrically conductive filler; and
    c) from 10 to 70 wt % of a solvent;
    d) from 5 to 25% wt % a resin selected from the group consisting of copolymer of vinyl chloride and vinyl acetate, polyvinyl alcohol resin, polyvinyl butyral resin and mixtures thereof; and
    e) from 0.1 to 0.5% wt % of a defoamer wherein the wt % is based on the total weight of the composition.

2. The water absorbing, electrically conductive composition according to claim 1, wherein said water soluble and/or water swellable and/or water absorbing resin is selected from the group consisting of sodium polyacrylate, polyvinylpyrrolidone (PVP), cellulose ethers, methyl cellulose, hydroxyl propyl cellulose, arabic gum, starch (dextrin), casein (phosphoproteins) and mixtures thereof.

3. The water absorbing, electrically conductive composition according to claim 2, wherein said water soluble and/or water swellable and/or water absorbing resin is selected from the group consisting sodium polyacrylate, polyvinylpyrrolidone (PVP), methyl cellulose and mixtures thereof.

4. The water absorbing, electrically conductive composition according to claim 1, wherein said electrically conductive filler is selected from the group consisting of carbon, carbon black, carbon nanotubes, graphite, graphene, silver, nickel, copper, gold, platinum, aluminium, iron, zinc, cobalt, lead, tin alloys, silver coated copper, silver coated graphite, silver coated polymers, silver coated aluminium, silver coated glass, silver coated carbon, silver coated boron nitride, silver coated aluminium oxide, silver coated aluminium hydroxide and mixtures thereof.

5. The water absorbing, electrically conductive composition according to claim 4, wherein said electrically conductive filler is selected from the group consisting of carbon black, carbon nanotubes, graphite and mixtures thereof.

6. The water absorbing, electrically conductive composition according to claim 1, wherein said solvent has a boiling point less than 235° C., and selected from the group consisting of n-butanol, butylcarbitol, 1-methoxy-2-propanol acetate, isopropyl alcohol, butyl cellosolve and mixtures thereof.

7. The water absorbing, electrically conductive composition according to claim 6, wherein said solvent is selected from the group consisting of n-butanol, butylcarbitol, 1-methoxy-2-propanol acetate and mixtures thereof.

8. The water absorbing, electrically conductive composition according to claim 6, wherein said defoamer is a silicone-free polymer air release agent.

9. A cured product of a water absorbing, electrically conductive composition according to claim 1.

10. The cured product of the water absorbing, electrically conductive composition of claim 9, which is a coating material.

\* \* \* \* \*